US008385831B2

(12) United States Patent
Memik et al.

(10) Patent No.: US 8,385,831 B2
(45) Date of Patent: Feb. 26, 2013

(54) SECURE COGNITIVE RADIO TRANSMISSIONS

(75) Inventors: Gokhan Memik, Evanston, IL (US); Seda Ogrenci Memik, Evanston, IL (US); Bill Mangione-Smith, Kirkland, WA (US)

(73) Assignee: Empire Technology Development LLC, Wilmington, DE (US)

( * ) Notice: Subject to any disclaimer, the term of this patent is extended or adjusted under 35 U.S.C. 154(b) by 863 days.

(21) Appl. No.: 12/508,549

(22) Filed: Jul. 23, 2009

(65) Prior Publication Data
US 2011/0021152 A1    Jan. 27, 2011

(51) Int. Cl.
*H04B 15/00*    (2006.01)
*H04B 17/00*    (2006.01)
(52) U.S. Cl. ............................ 455/62; 455/63.1; 455/63.3
(58) Field of Classification Search .................. 455/62, 455/63.1, 63.3, 67.11, 71, 454, 455, 464
See application file for complete search history.

(56) References Cited

U.S. PATENT DOCUMENTS

| | | | |
|---|---|---|---|
| 6,385,434 B1 | 5/2002 | Chuprun et al. | |
| 6,941,111 B2 | 9/2005 | McLain et al. | |
| 7,715,343 B2 * | 5/2010 | Tomioka | 370/329 |
| 8,111,653 B2 * | 2/2012 | Koyanagi | 370/329 |
| 8,170,064 B2 * | 5/2012 | Choi et al. | 370/482 |
| 2006/0229029 A1 | 10/2006 | Waltho et al. | |
| 2007/0042733 A1 | 2/2007 | Tomioka | |
| 2007/0091720 A1 | 4/2007 | Woo et al. | |
| 2007/0117537 A1 | 5/2007 | Hui et al. | |
| 2007/0207737 A1 | 9/2007 | Hui et al. | |
| 2007/0253394 A1 | 11/2007 | Horiguchi et al. | |
| 2008/0080604 A1 | 4/2008 | Hur et al. | |
| 2008/0112310 A1 | 5/2008 | Choi et al. | |
| 2008/0155249 A1 | 6/2008 | Backof et al. | |
| 2008/0207131 A1 | 8/2008 | Coersmeier | |
| 2008/0214130 A1 | 9/2008 | Park et al. | |
| 2008/0233991 A1 | 9/2008 | Gillig et al. | |
| 2008/0268892 A1 | 10/2008 | Hamdi et al. | |
| 2009/0016340 A1 | 1/2009 | Eberle | |
| 2009/0060001 A1 | 3/2009 | Waltho et al. | |
| 2009/0143019 A1 | 6/2009 | Shellhammer | |
| 2009/0149208 A1 | 6/2009 | Huttunen et al. | |
| 2009/0247201 A1 | 10/2009 | Ye et al. | |
| 2009/0253376 A1 | 10/2009 | Parssinen et al. | |
| 2010/0062718 A1 | 3/2010 | Zhou et al. | |
| 2010/0330919 A1 | 12/2010 | Gurney et al. | |

FOREIGN PATENT DOCUMENTS

WO    WO 2008/039872 A2    4/2008

OTHER PUBLICATIONS

U.S. Office Action dated Nov. 18, 2011 in U.S. Appl. No. 12/511,962.
U.S. Office Action dated Nov. 22, 2011 in U.S. Appl. No. 12/512,018.

(Continued)

Primary Examiner — Tuan H Nguyen
(74) Attorney, Agent, or Firm — Hope Baldauff Hartman, LLC

(57) ABSTRACT

In accordance with various embodiments methods, systems and devices are described for transmitting a communication. The described methods include, but are not limited to, detecting spectrum holes and dividing the communication into first and second portions. The methods may also include transmitting the first portion at a first frequency and the second portion at a second frequency. The first and second frequencies may be different from each other, and the first and second frequencies may be within the spectrum holes.

20 Claims, 3 Drawing Sheets

OTHER PUBLICATIONS

International Preliminary Report on Patentability for International Application No. PCT/US2010/039902 dated Jan. 24, 2012.

U.S. Official Action dated Mar. 12, 2012 in U.S. Appl. No. 12/512,014.

U.S. Official Action dated Mar. 20, 2012 in U.S. Appl. No. 12/511,947.

Devroye, N., et al., "Achievable Rates in Cognitive Radio Channels," IEEE Transactions on Information Theory, May 2006, vol. 52, No. 5, pp. 1813-1827.

U.S. Official Action dated May 24, 2012 in U.S. Appl. No. 12/511,955.

U.S. Official Action dated May 18, 2012 in U.S. Appl. No. 12/511,962.

U.S. Official Action dated May 18, 2012 in U.S. Appl. No. 12/512,018.

Ye, Z. et al., "Energy Detection using Estimated Noise Variance for Spectrum Sensing in Cognitive Radio Networks", in Proc. of Wireless Communications and Networking Conference (WCNC), Las Vegas, NV, Mar./Apr. 2008, (6 pages).

Ye, Z. et al., "Spectrum Sensing Using Cyclostationary Spectrum Density for Cognitive Radios", in Proc. of 26th Workshop on Signal Processing Systems (SiPS), Shanghai, China, Oct. 2007, (6 pages).

Ye, Z. et al. "Digital Modulation Classification Using Temporal Waveform Features for Cognitive Radios", in Proc. of 18th Annual International Symposium on Personal, Indoor and Mobile Radio Communications (PIMRC), Athens, Greece, Sep. 2007, (5 pages).

Ye, Z. et al., "An FPGA Based All Digital Transmitter with Radio Frequency Output for Software Defined Radio", in Proc. of Design, Automation, and Test in Europe (DATE), Nice, France, Apr. 2007, (6 pages).

Gokhan Memik, William H. Mangione-Smith, "Increasing power efficiency of multi-core network processors through data filtering", CASES 2002: 108-116, (9 pages).

Gokhan Memik, Mahmut T. Kandemir, Alok Choudhary, "Design and Evaluation of a Smart Disk Cluster for DSS Commercial Workloads", Journal of Parallel and Distributed Computing (JPDC), vol. 61, Issue 11, pp. 1633-1664, (2001).

A. Mallik, Y. Zhang, G. Memik, "Automated Task Distribution in Multicore Network Processors using Statistical Analysis", in Proc. of International Symposium on Architectures for Networking and Communications Systems (ANCS), Orlando, FL, Dec. 2007.

Gokhan Memik and William H. Mangione-Smith, "NEPAL: A Framework for Efficiently Structuring Applications for Network Processors", in Proc. of Second Workshop on Network Processors (NP), held in conjunction with HPCA, Anaheim, CA, Feb. 2003.

Wendong Hu, et al. (May 2007). "Dynamic Frequency Hopping Communities for Efficient IEEE 802.22 Operation", IEEE Communications Magazine. pp. 80-87.

Petar Popovski, Hiroyuki Yomo, and Ramjee Prasad, "Strategies for adaptive frequency hopping in the unlicensed bands", IEEE Wireless Communications, Dec. 2006, http://kom.aau.dk/~petarp/papers/DAFH-AFR.pdf.

O. Simeone, J. Gambini, Y. Bar-Ness, U. Spagnolini, "Cooperation and Cognitive Radio," in Proceedings of IEEE ICC 2007, pp. 6511-6515, Jun. 2007.

"Functional Requirements for the 802.22 WRAN Standard", https://mentor.ieee.org/802.22/dcn/05/22-05-0007-46-0000-draft-wran-rqmts-doc.doc, (2005).

"IEEE 802.22 Wireless RAN Standard PHY and MAC Proposal", http://www.ieee802.org/22/Meeting_documents/2005_Nov/22-05-0098-00-0000_STM-Runcom_PHY-MAC_Outline.doc, (2005).

Haykin, S. "Cognitive Radio: Brain-Empowered Wireless Communications," IEEE Journal on Selected Areas in Communications, vol. 23, No. 2, pp. 201-220 (Feb. 2005).

Robust Distributed Spectrum Sensing in Cognitive Radio Networks Ruiliang Chen, Jung-Min Park, and Kaigui Bian IEEE INFOCOM 2008, Apr. 2008, Phoenix, AZ.

Toward Secure Distributed Spectrum Sensing in Cognitive Radio Networks Ruiliang Chen, Jung-Min Park, Y. Thomas Hou, and Jeffrey H. Reed First IEEE Workshop on Networking Technologies for Software Defined Radio (SDR) Networks, Sep. 2006, Reston, VA.

Cabric et al., "Implementation Issues in Spectrum Sensing for Cognitive Radios", Nov. 2004, Asilomar Conference on Signals, Systems and Computers, 5 pages.

Devroye et al., "Achievable rates and scaling laws for cognitive radio channels", Jan. 2008, EURASIP Journal on Wireless Communications and Network, vol. 2008, 12 pages.

Eksim et al., "Effective cooperative spectrum sensing in IEEE 802.22 standard with time diversity", Jul. 15-17, 2009, International Conference on Advances in Computational tools for engineering applications 2009 ACTEA '09, pp. 528-531. Abstract.

Gandetto et al., "A distributed approach to mode identification and spectrum monitoring for cognitive radios", Nov. 2005, Proceedings of the SDR 05 Technical Conference and Product Exposition, 6 pages.

Ghasemi et al., "Collaborative spectrum sensing for opportunistic access in fading environments", Nov. 2005, IEEE Symposium on New Frontiers in Dynamic Spectrum Acess Networks, 6 pages.

Ghasemi et al., "Spectrum sensing in cognitive radio networks: requirements, challenges and design trade-offs", Apr. 2008, IEEE Communications Magazine, pp. 32-39, 8 pages.

Neihart et al., "A Parallel, multi-resolution sensing technique for multiple antenna cognitive radios", May 27-30, 2007, IEEE International Symposium on Circuits and Systems (ISCAS), pp. 2530-2533, 4 pages.

International Search Report dated Oct. 8, 2010 in International Application No. PCT/US10/39805.

International Search Report dated Nov. 1, 2010 in International Application No. PCT/US10/39902.

International Search Report dated Oct. 15, 2010 in International Application No. PCT/US10/399918.

International Search Report dated Nov. 8, 2010 in International Application No. PCT/US10/39912.

International Search Report dated Nov. 3, 2010 in International Application No. PCT/US10/39903.

U.S. Official Action dated Sep. 3, 2012 in U.S. Appl. No. 12/512,014.

U.S. Official Action dated Sep. 11, 2012 in U.S. Appl. No. 12/511,947.

\* cited by examiner

SECURE COGNITIVE RADIO TRANSMISSIONS

REFERENCE TO RELATED APPLICATIONS

This application is related to the following co-pending applications, application Ser. No. 12/511,947 entitled "Location and Time Sensing Cognitive Radio Communication Systems" filed Jul. 29, 2009; application Ser. No. 12/512,018 entitled "Spectrum Sensing Network For Cognitive Radios" filed Jul. 29, 2009; application Ser. No. 12/511,962 entitled "Spectrum Sensing Network" filed Jul. 29, 2009; application Ser. No. 12/512,014 entitled "Cognitive Radios For Secure Transmissions" filed Jul. 29, 2009; and application Ser. No. 12/511,955 entitled "Hierarchical Spectrum Sensing For Cognitive Radios" filed Jul. 29, 2009.

BACKGROUND

The electromagnetic radio spectrum is a natural resource, the use of which by transmitters and receivers is licensed by governments. In many bands, spectrum access is a more significant problem than physical scarcity of spectrum, in large part due to legacy command-and-control regulation that limits the ability of potential spectrum users to obtain such access. Indeed, if portions of the radio spectrum were scanned, including in the revenue-rich urban areas, one would find that some frequency bands in the spectrum are largely unoccupied most of the time; some other frequency bands are only partially occupied; and the remaining frequency bands are heavily used.

The underutilization of the electromagnetic spectrum has led to the view that spectrum holes within the electromagnetic spectrum exist. As used herein, a spectrum hole exists when a band of frequencies assigned to a primary user is not being utilized by that user, at a particular time and specific geographic location. By making it possible for a secondary user to access the band of frequencies within a spectrum hole, utilization of the electromagnetic spectrum may be improved. A cognitive radio, inclusive of software-defined radio, has been proposed as a means to promote the efficient use of the electromagnetic spectrum by exploiting the existence of spectrum holes.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
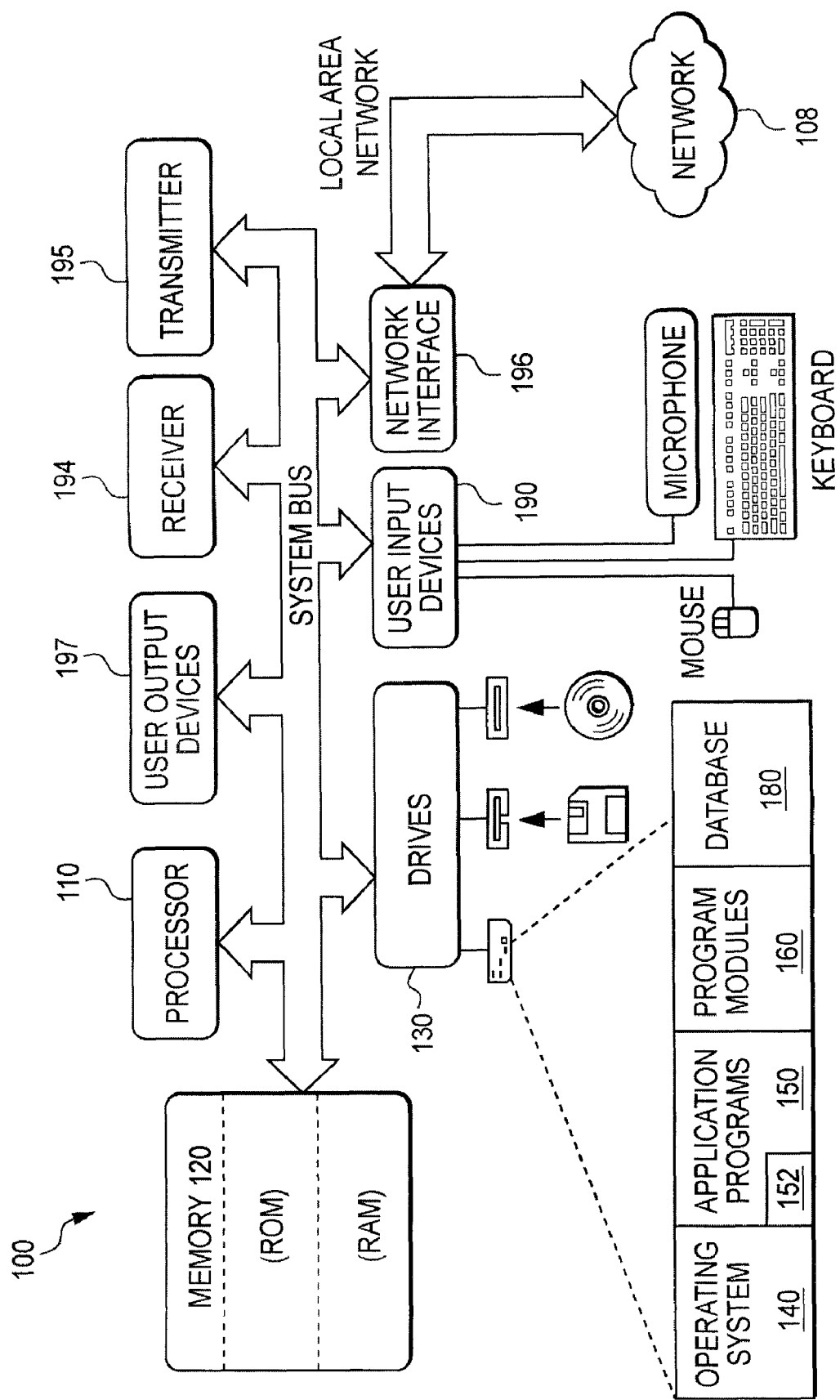
FIG. 1 depicts a cognitive radio.

The following description sets forth various examples along with specific details to provide a thorough understanding of claimed subject matter. However, it will be understood by those skilled in the art that claimed subject matter may be practiced without some or more of the specific details disclosed herein. Further, in some circumstances, well-known methods, procedures, systems, components and/or circuits have not been described in detail in order to avoid unnecessarily obscuring claimed subject matter. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, apparatus, systems and computer program products related to cognitive devices. The present disclosure may make use of the discovery that by using a cognitive radio to transmit a communication using RF signals in a non-sequential or random manner, the communication may be transmitted in a more secure manner. Additionally, by using a cognitive radio, a communication may be transmitted using multiple frequencies. In this manner, from a security standpoint, a communication may be transmitted in a more secure manner using a cognitive radio with variable frequency and non-sequential transmission characteristics.

As used herein, the phrase "cognitive task" may include one or more of (1) radio-scene analysis, (2) estimating interference temperature (a metric which quantifies sources of interference in a radio environment), (3) detecting spectrum holes, by spectrum sensing, (4) channel identification, (5) estimation of channel-state information, (6) prediction of channel capacity for use by the transmitter, (7) transmit-power control, and/or (8) dynamic spectrum management. As used herein, the phrase "cognitive device" may include any device which may carry out cognitive tasks, such as a cognitive radio, or a cognitive receiver. As used herein, the phrase "cognitive information" may include any information which may be used to assist in carrying out a cognitive task. As used herein, the phrase "cognitive instruction" may include any instruction which may help accomplish a cognitive task.

In some examples of the present disclosure, methods for transmitting a communication such as a digital communication are described. The methods include, but are not limited to, detecting spectrum holes and dividing the communication into first and second portions. The methods may also include transmitting the first portion at a first frequency and the second portion at a second frequency. The first and second frequencies may be different from each other, and where the first and second frequencies are within the spectrum holes.

In some additional examples, methods for communicating in example communication systems are described where the communications systems may include a cognitive radio with a cognitive receiver for processing a cognitive task and a cognitive transmitter for transmitting a communication to a communications device including a cognitive radio. The methods may also include detecting which radio frequencies are available for use, and transmitting the digital communication using first and second frequencies which are available for use.

In yet another example, methods are described for operating a cognitive radio. The described methods include, but are not limited to, processing a spectrum sensing task in order to determine which radio frequencies are available for use. The methods may also include transmitting a first portion of a digital communication at a first frequency and a second portion of the digital communication at a second frequency. The first and second frequencies can be different from each other. The first and second frequencies may be available for use.

FIG. 1 depicts a cognitive radio for implementing some embodiments in accordance with the present disclosure. As shown in FIG. 1, a cognitive radio 100, may include a processor 110, a memory 120 and one or more drives 130. The drives 130 and their associated computer storage media, may be configured to provide storage of computer readable instructions, data structures, program modules and other data for the cognitive radio 100. The drives 130 can include an operating system 140, application programs 150, program modules 160, and a database 180. Application programs 150, for example, may include an application program containing program instructions for causing a cognitive radio 100 to carry out the functions specified in FIG. 4, for example a method for transmitting a communication 152. Cognitive radio 100 may further include user input devices 190 through which a user may enter commands and data. Input devices may include an electronic digitizer, a microphone, a keyboard and a pointing device, commonly referred to as a mouse, trackball or touch pad. Other input devices may include a joystick, game pad, satellite dish, scanner, or the like.

These and other input devices can be connected to processor 110 through a user input interface that may be coupled to a system bus, but may be connected by other interface and bus structures, such as a parallel port, game port or a universal serial bus (USB). Cognitive radio 100 also may include a receiver 194 through which radio frequency signals may be received and a transmitter 195 through which radio frequency signals may be transmitted. Cognitive radio 100 with receiver 194 and without transmitter 195 may be referred to herein as a cognitive receiver, and cognitive radio 100 with transmitter 195 and without receiver 194 may be referred to herein as a cognitive transmitter. In some embodiments, the cognitive radio 100 may include a transceiver, instead of receiver 194 and transmitter 195, where the transceiver may operate as both a transmitter and a receiver.

Cognitive radio 100 may operate in a networking environment using connections to one or more computers, such as a remote computer coupled to network interface 196. The remote computer may be a personal computer (PC), a server, a router, a network PC, a peer device or other common network node, and can include some or all of the elements described above relative to cognitive radio 100. Networking environments are commonplace in offices, enterprise-wide area networks (WAN), local area networks (LAN), intranets and the Internet.

For example, cognitive radio 100 may be the source from which data is being migrated, and the remote computer may be the destination to which the data is being migrated, or vice versa. Note, however, that the source and destination need not be connected by a network 108 or any other means, but instead data may be migrated via any media capable of being written by the source and read by the destination. When used in a LAN or WAN networking environment, cognitive radio 100 may be connected to the LAN through a network interface 196 or an adapter. When used in a WAN networking environment, cognitive radio 100 may include a modem or other means for establishing communications over the WAN, such as the Internet or network 108. It will be appreciated that other means of establishing a communications link between the source and destination may be used. Cognitive radio 100 may also be coupled to user output devices 197 for outputting information to a user. User output devices 197 may include, for example, a display, a printer and speakers.

Figure 2:
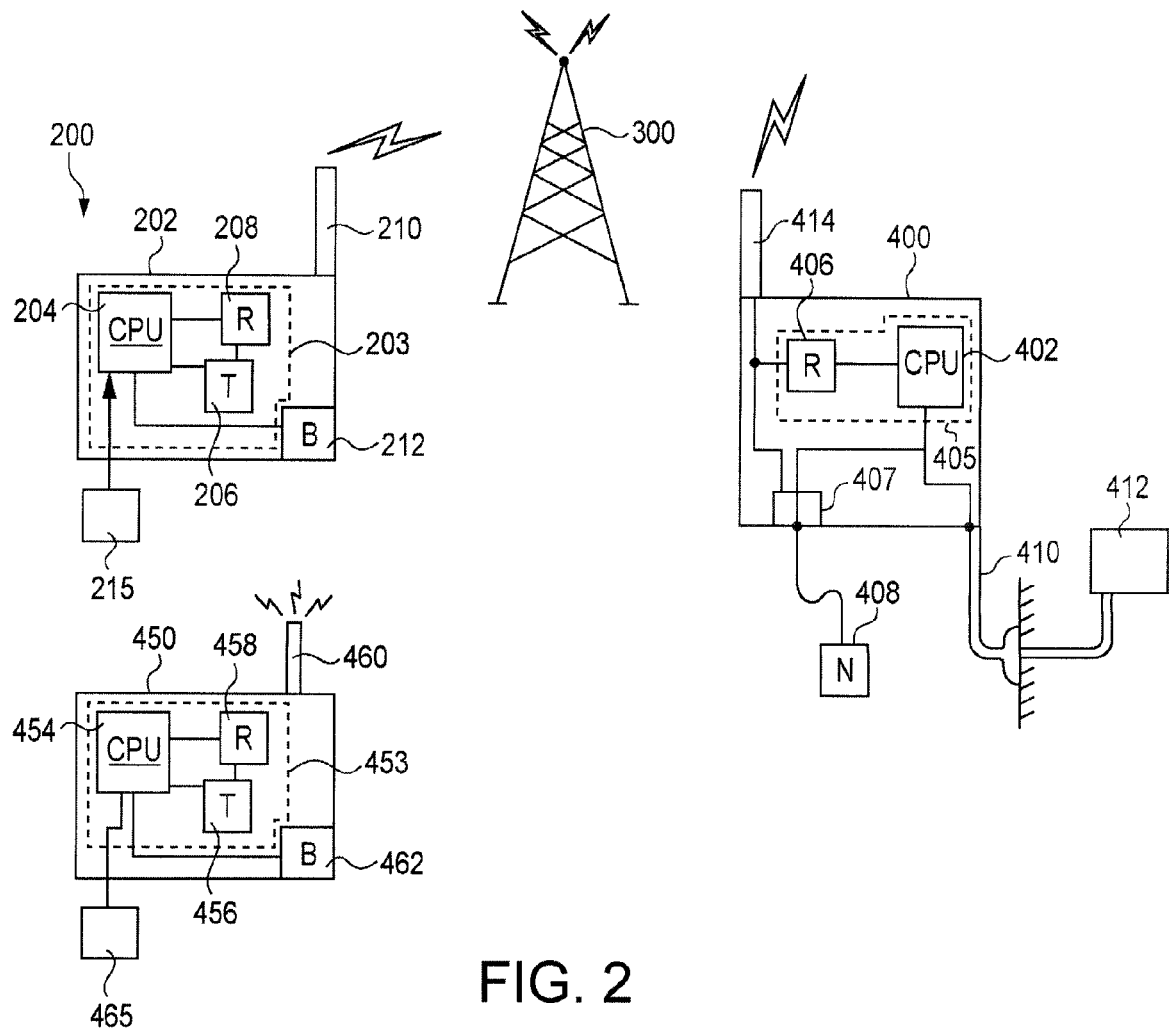
FIG. 2 depicts a schematic representation of a communications system.

FIG. 2 depicts a schematic representation of a communications system, in accordance with some embodiments of the present disclosure. As shown in FIG. 2, a communications system 200 may be provided. The communications system 200 may include a communications device 202 that may be arranged in communication with a cognitive device 400 and a transmission tower 300 and another communications device 450.

The communications device 202 may be any device that may be adapted to transmit or receive RF signals, and may be, for example, a wireless telephone, a radio, a hand-held two-way radio transceiver, or the like. The communications device 202 may include a cognitive radio 203, an antenna 210, and/or a power source 212. The cognitive radio 203 may be a wireless communication device that may be configured to change its transmission or reception parameters to communicate efficiently and avoid interference with licensed or unlicensed users of other communications devices 450. The cognitive radio 203 may be configured to perform cognitive tasks, which may include the alteration of parameters based on the active monitoring of several factors in the external and internal radio environment, such as, for example, radio frequency spectrum, user behavior and network state. The cognitive tasks performed by cognitive radio 203 may begin with the passive sensing of RF stimuli, called spectrum sensing. The following are examples of other optional cognitive tasks performed by cognitive radio 203: (1) radio-scene analysis, which may encompass: (1)(a) estimating interference temperature (a metric which quantifies sources of interference in a radio environment); and/or (1)(b) detecting spectrum holes, by spectrum sensing; (2) channel identification, which may encompass: (2)(a) estimation of channel-state information; and/or (2)(b) prediction of channel capacity for use by the transmitter; and/or (3) transmit-power control and dynamic spectrum management.

Cognitive radio 203 functionally may include all or some of the components of cognitive radio 100, as described herein. Cognitive radio 203 may include at least a processor 204 arranged in communication with a receiver 208 and optionally a transmitter 206. Transmitter 206 and receiver 208 may be replaced with a transceiver. Processor 204 may be configured to send cognitive instructions to both the receiver 208 and transmitter 206 and may be adapted to receive cognitive information, such as spectrum sensing information, from the receiver 208 when performing and processing cognitive tasks, such as spectrum sensing tasks. Communications device 202 may also include an input device 215 for inputting a communication received by processor 204. Input device 215 can include an electronic digitizer, a microphone, a keyboard and pointing device, commonly referred to as a mouse, trackball or touch pad. Other input devices may include a joystick, game pad, satellite dish, scanner, or the like.

The spectrum-sensing task detects spectrum holes, which may be bands of unused radio frequencies in the radio frequency (RF) spectrum available for use by cognitive radio 203. The cognitive radio 203 and/or cognitive receiver 405 may passively sense the RF spectrum and estimate the power spectra of incoming radio frequency stimuli, in order to classify the RF spectrum into one of three broadly defined types of radio frequencies: (1) black spaces, which may be occupied by high-power "local" interferers some of the time; (2) grey spaces, which may be partially occupied by low-power interferers; and (3) white spaces, which may be substantially free of RF interferers except for ambient noise, made up of natural and artificial forms of noise. Ambient noise may include: broadband thermal noise produced by external physical phenomena such as solar radiation; transient reflections from lightening, plasma (fluorescent) lights, and aircraft; impulsive noise produced by ignitions, commutators, and microwave appliances; and/or thermal noise due to internal spontaneous fluctuations of electrons at the front end of individual receivers.

White spaces and grey spaces, to a lesser extent, contain spectrum holes which make good candidates for use by cognitive radio 203. While black spaces are to be avoided when and where the RF emitters residing in them are switched ON, when those emitters are switched OFF, the black spaces assume a new role of "spectrum holes," and the cognitive radio 203 and/or cognitive receiver 405 may be arranged to provide the opportunity for discovering significant "white spaces" within the unused black spaces by invoking a dynamic-coordination capability for spectrum sharing.

As a result, by conducting a spectrum-sensing task, cognitive radio 203 may be able to determine which portion of the RF spectrum contains frequencies which are not being utilized, identifying spectrum holes. Thereafter, receiver 208 within cognitive radio 203 and/or cognitive receiver 405 may be arranged to communicate spectrum-sensing information which may contain information regarding spectrum holes, to processor 204 within cognitive radio 203. The spectrum sensing information may typically contain bands of frequencies within the white spaces and the grey spaces, however sometimes the bands of frequencies may be within the black spaces. Cognitive radios are described in: Haykin, S. "Cognitive Radio: Brain-Empowered Wireless Communications," IEEE JOURNAL ON SELECTED AREAS IN COMMUNICATIONS, Vol. 23, No. 2, pp. 201-220 (February 2005).

Upon conducting a spectrum-sensing task and determining which portion of the RF spectrum contains frequencies which may not be utilized (or available), receiver 208 within cognitive radio 203 may be arranged to communicate spectrum sensing information, which may contain information about spectrum holes, to processor 204 within cognitive radio 203. The spectrum sensing information may contain bands of frequencies that may be within the white spaces and the grey spaces, or the bands of frequencies may be within the black spaces.

In some embodiments, when performing a spectrum sensing task, the processor 204 may be configured to send cognitive instructions to the receiver 208 instructing the receiver 208 to scan the RF spectrum for spectrum holes. The receiver 208 may be configured to send spectrum sensing information to the processor 204 informing the processor 204 of spectrum holes (i.e., receiver 208 may inform the processor 204 which bands of RF frequencies may be available for use). The processor 204 may be configured to send cognitive instructions to the transmitter 206 which may be configured to transmit at a radio frequency available for use, or within one of the spectrum holes.

Receiver 208 may be arranged to receive RF signals, either digital or analog, from antenna 210 and transmitter 206 may be arranged to transmit RF signals through antenna 210. Antenna 210 may be arranged to transmit or receive RF signals to transmission tower 300, which may broadcast these RF signals, for example, via land lines or other RF signals, to other communications devices, which may include wireless communications devices, such as communications device 450, or wired communications devices such as telephones. Antenna 210 may be adapted to send RF signals to and receive signals from other communications devices 450 and cognitive device 400.

Power source 212 may be arranged in communication with and may power cognitive radio 203. Power source 212 may be portable and may be, for example, a battery, a fuel cell, a lithium ion battery, and/or a capacitor.

Cognitive tasks, such as spectrum sensing, may require the detection of spectrum holes and their subsequent exploitation in the management of radio spectrum, which may be time consuming and may use significant power. By offloading some cognitive tasks from cognitive radio 203 to another device, such as cognitive device 400, the amount of electrical power used by communications device 202 may be reduced along with the amount of computational power. The amount of time required to perform cognitive tasks within the communications device 202 may also be reduced.

Cognitive device 400 may include a cognitive receiver 405 arranged for processing cognitive tasks, an antenna 414 adapted for receiving radio frequency signals, and a communications port 407. Cognitive device 400 may be arranged in communication with communications device 202 through a variety of means, such as, wired communication which may include USB, Firewire, and network cabling such as CAT-5 or fiber optic cable, or wireless communication which may include Bluetooth, Wi-Fi, WiMax, EDGE (Enhanced Data rates for GSM Evolution), GSM (Global System for Mobile communications), GPRS (General packet radio service), 3G, 4G, CDMA (Code division multiple access), or any other communications protocol which may transmit RF signals. In a LAN or WAN networking environment, cognitive device 400 may be in communication with communications device 202 through a network interface 196 (FIG. 1) or an adapter. In a WAN networking environment, cognitive device 400 may include a modem or other means for establishing communications over the WAN, such as the Internet or network 108 (FIG. 1). Other means of establishing a communications link between the cognitive device 400 and the communications device 202 may also be used.

The cognitive receiver 405 may be a wireless communication device which may be configured to change its reception parameters to communicate efficiently and avoid interference with licensed or unlicensed users of other communications devices 450. The cognitive receiver 405 may be arranged to perform cognitive tasks, which may include the alteration of parameters based on the active monitoring of several factors in the external and internal radio environment, such as radio frequency spectrum, user behavior and network state. The cognitive tasks performed by cognitive receiver 405 may begin with the passive sensing of RF stimuli, called spectrum sensing, and an action may follow. The following examples of cognitive tasks may be performed by cognitive receiver 405: (1) radio-scene analysis, which may encompass: (1)(a) estimating interference temperature (a metric which quantifies sources of interference in a radio environment); and/or (1)(b) detecting spectrum holes, by spectrum sensing; (2) channel identification, which may encompass: (2)(a) estimation of channel-state information; and/or (2)(b) prediction of channel capacity for use by the transmitter.

Cognitive receiver 405 may include substantially all the components of cognitive radio 100, as described herein. Cognitive receiver 405 may also include at least a processor 402 that may be arranged in communication with a receiver 406. Processor 402 may be configured to send cognitive instructions to the receiver 406 and may be configured to receive cognitive information from the receiver 406 when performing and processing cognitive tasks, such as a spectrum-sensing task.

In some examples, when performing a spectrum sensing task, the processor 402 may be adapted to send cognitive instructions to the receiver 406 instructing the receiver 406 to scan the RF spectrum for spectrum holes. The receiver 406 may be adapted to send spectrum sensing information to the processor 402 informing the processor 402 of spectrum holes (i.e., receiver 406 may inform the processor 402 which bands of RF frequencies may be available for use). The process of sending spectrum sensing information to the processor 402 informing the processor 402 of spectrum holes may be repeated multiple times for different parts of the RF spectrum. The processor 402 may be configured to send the cognitive information through the communications port 407 to the communications device 202, which may be configured to receive the cognitive information through antenna 210 and forward the cognitive information to processor 204. Processor 204 may be arranged to instruct the transmitter 206 to transmit at a radio frequency that may be available for use, or within one of the spectrum holes. In this manner, cognitive receiver 405 may be able to perform certain cognitive tasks that would otherwise be performed by cognitive radio 203. In doing so, cognitive receiver 405 may be able to reduce the amount of electrical power and processing power used by cognitive radio 203. This may allow communications device 202 to be able to operate with a less powerful processor 204 and a lower capacity power source 212 or operate for longer durations.

Communications port 407 may be arranged in communication with the communications device 202 and may be arranged to communicate cognitive information to communications device 202. Communications port 407 may be arranged in communication with the communications device 202 through a network 408. Communications port 407 may also be able to directly communicate with communications device 202 through antenna 414, and may communicate cognitive information directly to communications device 202. Network 408 may be arranged in communication with both communications device 202 and cognitive device 400, for example, via a wired or wireless connection.

Receiver 406 may be arranged to receive RF signals, either digital or analog, from antenna 414. Antenna 414 may be arranged to transmit or receive RF signals to/from transmission tower 300, which may broadcast these RF signals, for example, via land lines or other RF signals, to other communications devices, which may include wireless communications devices, such as communications devices 202 and 450, or wired communications devices such as telephones.

Cognitive device 400 may include a power source 410 which may be arranged in communication with and power cognitive receiver 405. Power source 410 may include a power connector that may be configured to connect with a stationary power source 412, such as a power generating plant. In this manner, cognitive device 400 may be able to use a nearly limitless supply of power in order to process cognitive tasks which may otherwise be processed by communications device 202.

In some embodiments, communications device 450 may be substantially identical to communications device 202 and may contain identical components including a cognitive radio 453, an antenna 460, and/or a power source 462, which respectively correspond with cognitive radio 203, antenna 210, and power source 212. The cognitive radio 453 may be a wireless communication device which changes its transmission or reception parameters to communicate efficiently and avoid interference with licensed or unlicensed users of other communications devices. Cognitive radio 453 may include at least one processor 454 arranged in communication with a receiver 458 and optionally a transmitter 456. Transmitter 456 and receiver 458 can be replaced with a transceiver. Communications device 450 operates in substantially the same manner as communications device 202, as described herein. Communications device 450 may also include an input device 465 for inputting a communication received by processor 454. Input device 465 can include an electronic digitizer, a microphone, a keyboard and pointing device, commonly referred to as a mouse, trackball or touch pad. Other input devices may include a joystick, game pad, satellite dish, scanner, or the like.

In some embodiments, when performing a spectrum sensing task, the processor 204 may be arranged to send cognitive instructions to the receiver 208 instructing the receiver 208 to scan the RF spectrum for spectrum holes. The receiver 208 may be arranged to send spectrum sensing information to the processor 204, informing the processor 204 of spectrum holes, thereby informing the processor 204 which bands of RF frequencies are available for use. The processor 204 may be arranged to send cognitive instructions to the transmitter 206 to transmit a communication at a radio frequency available for use, or within one of the spectrum holes.

Figure 3:
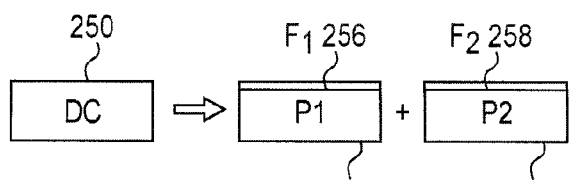
FIG. 3 depict a block diagram of a communication.

FIG. 3 depicts a block diagram of a transmission of a digital communication, arranged in accordance with the present disclosure. As shown in FIG. 3, digital communication 250 may be broken up into n number of smaller portions, where n is an integer, for example 2 to 1000, including 3 to 500, 4 to 100, or even 5 to 20, for example first and second portions 252 and 254. Each portion can be transmitted via transmitter 206 sequentially, that is in order, so that first portion 252 may be transmitted before second portion 254, or non-sequentially, that is not in order, so that for example, first portion 252 would be transmitted after second portion 254. Additionally, first and second portions 252 and 254 may be transmitted in a random order, where processor 204 randomly chooses which of first and second portions 252 and 254 to transmit first and which to transmit second, and so forth. This is easily extrapolated to larger values of n, so that for example 100 different portions of digital communication 250 could be transmitted in a random order, or in another non-sequential order, such as each odd-numbered portion followed by each even-numbered portion. Digital communication 250 may include any digital information, or data, which can be encoded for computer storage and processing purposes, and includes any type of data such as hexadecimal data, decimal data, binary data, or ASCII character data. The digital information included in digital communication 250 can include encoded audio signals, encoded video signals, text, and any other type of raw data.

Processor 204 may also instruct transmitter 206 to transmit the first portion 252 at a first frequency 256 and the second portion at a second frequency 258, where the first and second frequencies 256 and 258 are different from each other. Additionally, the first and second frequencies 256 and 258 may be radio frequencies available within the spectrum holes discovered by processor 204 and receiver 208 while performing the spectrum sensing task, that is, first and second frequencies 256 and 258 are radio frequencies which are unused and available for use.

Radio frequencies which are unused and available for use may be found by the communications device 202 itself, or found by another device, such as another communications device 450 or the cognitive device 400, and then communicated to the communications device 202. In one embodiment, first and second frequencies 256 and 258 are chosen randomly from radio frequencies available for use within the spectrum holes. However, first and second frequencies 256 and 258 may also be chosen in a predetermined fashion, such as sequentially, or via some preset mathematical arrangement, from radio frequencies available for use within the spectrum holes. In this way, by transmitting digital communication 250 in multiple portions non-sequentially and/or using multiple frequencies, it is possible to transmit digital communication 250 in a more secure manner.

Communications device 450, and specifically receiver 458 within communications device 450, may be arranged to receive RF signals containing the digital communication 250, or portions 252, 254 of the digital communication 250, from antenna 210 and transmitter 206. Receiver 458 may configure itself to receive digital communication 250, and specifically, to receive first and second frequencies 256 and 258. Receiver 458 may be either preprogrammed with information as to what frequencies first and second frequencies 256 and 258 are, or communications device 202 may send transmission frequencies 256 and 258 to communications device 450 in advance, so that receiver 458 may configure itself to receive first and second portions 252 and 254.

In some embodiments, second portion 254 may be received by the communications device 450 before the first portion 252. In another embodiment, the first portion 252 may be received by the communications device 450 before the second portion 254, but the portions are transmitted at first and second frequencies 256 and 258. The order in which first and second portions 252 and 254 are transmitted may be preprogrammed into communications device 450, or communications device 202 may send communications device 450, in advance or after transmission of first and second portions 252 and 254, information containing the order in which the portions 252 and 254 of communication 250 are transmitted, so that processor 454 properly assemble the portions back into communication 250.

Upon receiving RF signals containing first and second portions 252 and 254, processor 454 may be configured to assemble the first and second portions 252 and 254 back into digital communication 250. By transmitting communication 250 using first and second frequencies 256 and 258, communications device 202 may be able to transmit communication 250 in a secured manner to communications device 450. Additionally, by dividing communication 250 into portions 252 and 254, communications device 202 may be able to transmit communication 250 in a secured manner to communications device 450.

Figure 4:
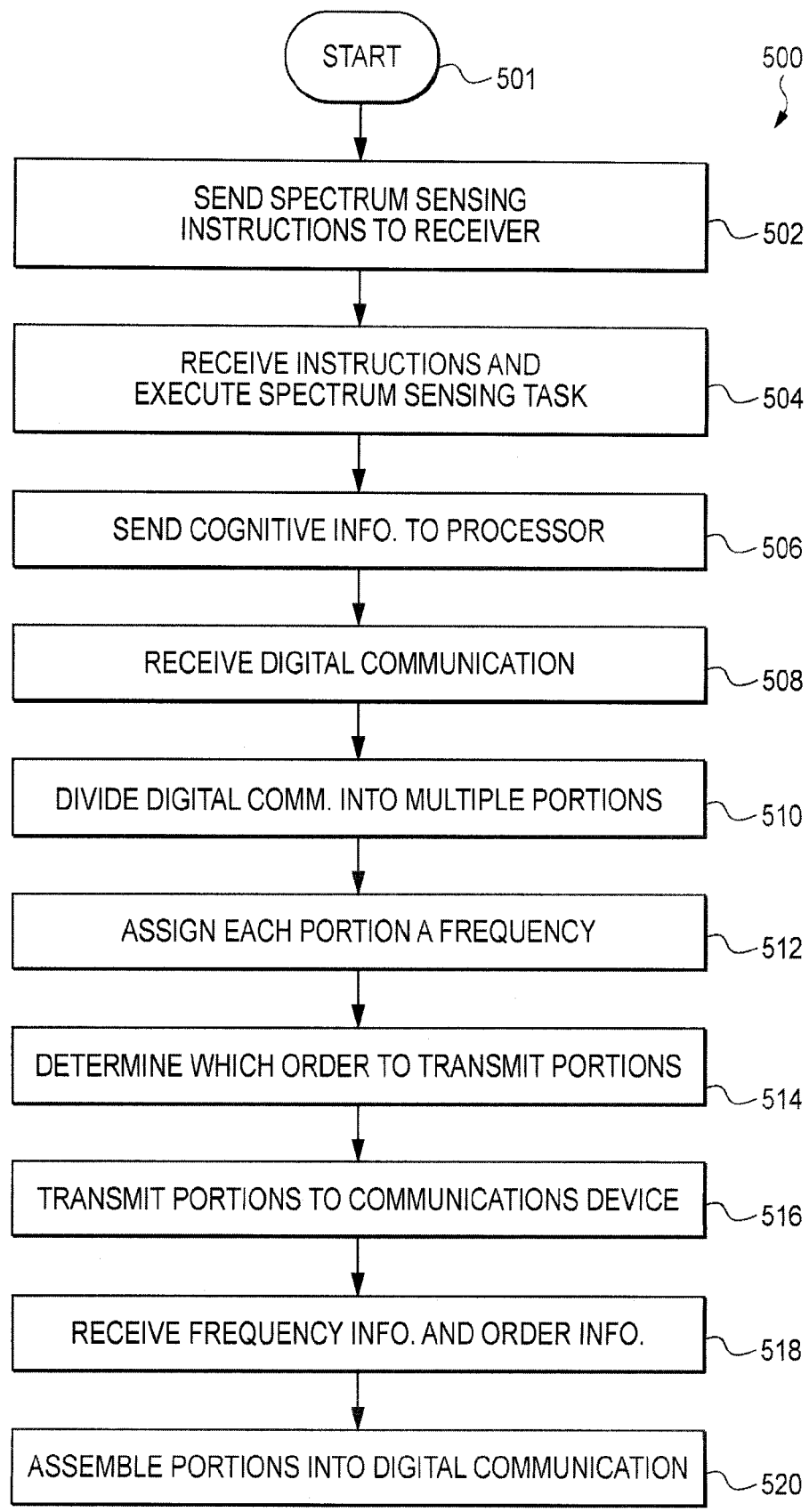
FIG. 4 depicts a flowchart illustration of methods, apparatus (systems) and computer program products, all arranged in accordance with at least some embodiments of the present disclosure.

FIG. 4 depicts a flowchart illustration of methods, apparatus (systems) and computer program products, in accordance with some embodiments of the present disclosure. It will be understood that each block of the flowchart illustration in FIG. 4, and combinations of blocks in the flowchart illustration in FIG. 4 may be implemented by computer program instructions. The computer program instructions may be loaded onto a computer, a processor, or other programmable data processing apparatus to produce a machine, such that the instructions which execute on the computer or other programmable data processing apparatus may create means for implementing the functions specified in the flowchart block or blocks. These computer program instructions may also be stored in a storage device that may direct a computer or other programmable data processing apparatus to function in a particular manner, such that the instructions stored in the storage device produce an article of manufacture including instruction means which may implement the function specified in the flowchart block or blocks. The computer program instructions may also be loaded onto a computer, a processor or other programmable data processing apparatus to cause a series of operational steps to be performed on the computer or other programmable data processing apparatus to produce a computer implemented process such that the instructions which execute on the computer or other programmable apparatus may provide steps for implementing the functions specified in the flowchart block or blocks.

Accordingly, blocks of the flowchart illustration in FIG. 4 support combinations of means for performing the specified functions, combinations of steps for performing the specified functions and program instruction means for performing the specified functions. Each block of the flowchart illustration in FIG. 4, and combinations of blocks in the flowchart illustration in FIG. 4, may be implemented by special purpose hardware-based computer systems which may perform the specified functions or steps, or combinations of special purpose hardware and computer instructions.

Such computer instructions may be fixed either on a tangible medium, such as a computer readable medium (e.g., a diskette, CD-ROM, ROM, or fixed disk) or transmittable to a computer system, via a modem or other interface device, such as a communications adapter coupled to a network over a medium. The medium, which is non-transitory, may be either a tangible medium (e.g., optical or analog communications lines) or a medium implemented with wireless techniques (e.g., microwave, infrared or other transmission techniques). The series of computer instructions may embody all or part of the functionality previously described herein with respect to the system.

Such computer instructions may be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web).

As seen in FIG. 4, a method 500 for transmitting a digital communication 250 in a secured manner, may be initiated at block 501. Upon initiating the method 500 for transmitting a digital communication 250 in a secured manner at block 501, processor 204 may be arranged to send cognitive instructions, specifically spectrum sensing instructions, to the receiver 208 at block 502. The spectrum sensing instructions may be any instruction that helps in accomplishing a spectrum sensing task. At block 504, receiver 208 may be arranged to receive the spectrum sensing instructions and begins to execute a spectrum sensing task, which requires receiver 208 to scan the RF spectrum for spectrum holes. Alternatively, cognitive device 400 may similarly carry out a spectrum sensing task, and transmit cognitive information, such as spectrum sensing information, to receiver 208 or to processor 204.

Upon finding some spectrum holes, receiver 208 may then be arranged to send cognitive information containing information regarding what spectrum holes are found, back to the processor 204, at block 506. The cognitive information may inform the processor 204 of the spectrum holes, that is which bands of RF frequencies are available for use. Upon receiving the cognitive information, processor 204 may then be adapted to receive digital communication 250 from an input device 215 at block 508, and may then divide digital communication 250 into at least two portions 252 and 254, at block 510. Processor 204 may then be configured to assign each portion 252 and 254 at least one frequency at which each portion may be transmitted, where each frequency assigned may be within the spectrum holes, at block 512. For example, first portion 252 may be assigned first frequency 256 and second portion 254 may be assigned second frequency 258 at which each may be transmitted. Alternatively, or in addition, the processor 204 may determine the order in which to transmit first and second portions 252 and 254, at block 514.

The processor 204 may then be arranged to instruct transmitter 206 to transmit to communications device 450 first portion 252 at the first frequency 256 and second portion 254 at the second frequency 258 in an order determined by the processor 204, at block 516. In some embodiments, transmitter 206 is arranged to transmit frequency information containing the frequencies at which the portions 252 and 254 of communication 250 are transmitted, and the order in which the portions 252 and 254 of communication 250 are transmitted, also at block 516.

Upon transmitting first and second portions 252 and 242, at block 518, receiver 458 may then be configured to receive first and second portions 252 and 254 at the order determined by processor 204 and at the first and second frequencies 256 and 258 at which first and second portions 252 and 254 are transmitted. Receiver 458 may be either preprogrammed with information as to what frequencies first and second frequencies 256 and 258 are, or communications device 202 sends communications device 450, in advance the frequency information containing the frequencies at which communication 250 may be transmitted, so that receiver 458 can configure itself to receive first and second portions 252 and 254.

If communications device 202 sends frequency information, receiver 458 then receives frequency information containing the frequencies at which the portions 252 and 254 of communication 250 are transmitted, also at block 518. If communications device 202 sends order information, receiver 458 also receives order information containing the order in which the portions 252 and 254 of communication 250 are transmitted, also at block 518.

Upon receiving RF signals containing first and second portions 252 and 254, processor 454 may be arranged to assemble the first and second portions 252 and 254 back into digital communication 250, in block 520. Processor 454 either uses order information received from communications device 202, or order information which may be preprogrammed into communications device 450, in order to assemble first and second portions 252 and 254 back into digital communication 250. In this manner, digital communication 250 can be transmitted in a more secure manner.

The herein described subject matter sometimes illustrates different components contained within, or connected with, different other components. It is to be understood that such depicted architectures are merely examples and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various embodiments of the invention have been described, it will be apparent to those of ordinary skill in the art that other embodiments and implementations are possible within the scope of the invention. Accordingly, the invention is not to be restricted except in light of the attached claims and their equivalents.

The invention claimed is:

1. A method for transmitting a communication, the method comprising:
   detecting at least two different frequencies of one or more spectrum holes;
   dividing, by other than bit-by-bit serial-to-parallel conversion, a communication into a first portion and a second portion, wherein the second portion follows the first portion within the communication in a sequential order;
   selecting a first frequency and a second frequency from the detected frequencies, wherein the first and second frequencies are different from each other;
   assigning the first frequency to the first portion;
   assigning the second frequency to the second portion;
   transmitting, via a communications device, the first portion at the first frequency assigned to the first portion; and
   transmitting, via the communications device, the second portion at the second frequency assigned to the second portion.

2. The method of claim 1, wherein the first and second frequencies are chosen randomly from the detected frequencies.

3. The method of claim 1, wherein the first and second frequencies are chosen sequentially from the detected frequencies.

4. The method of claim 1, wherein the first portion and the second portion are transmitted in the sequential order such that the first portion is transmitted before the second portion is transmitted.

5. The method of claim 1, wherein the first portion and the second portion are transmitted in a non-sequential order different from the sequential order such that the second portion is transmitted before the first portion is transmitted.

6. A method for transmitting a communication, comprising:
   detecting at least one frequency of one or more spectrum holes;
   dividing, by other than bit-by-bit serial-to-parallel conversion, a communication into a plurality of portions including a first portion and a second portion, wherein the second portion follows the first portion within the communication in a sequential order; and
   transmitting, via a communications device, the first portion and the second portion at the at least one frequency and in a non-sequential order different from the sequential order.

7. The method of claim 6, wherein the first portion and the second portion are transmitted in a random order.

8. The method of claim 6, wherein the plurality of portions further includes a third portion that follows the second portion within the communication in the sequential order; and
   wherein transmitting, via the communications device, the first portion and the second portion at the at least one frequency and in the non-sequential order different from the sequential order comprises transmitting, via the communications device, the first portion, the second portion, and the third portion at the at least one frequency and in the non-sequential order different from the sequential order.

9. The method of claim 6, wherein the detecting comprises detecting at least two different frequencies of the one or more spectrum holes.

10. The method of claim 9, further comprising:
    selecting a first frequency and a second frequency from the detected frequencies, wherein the first and second frequencies are different from each other;
    assigning the first frequency to the first portion;
    assigning the second frequency to the second portion;
    transmitting, via the communications device, the first portion at the first frequency assigned to the first portion; and
    transmitting, via the communications device, the second portion at the second frequency assigned to the second portion.

11. A computer program product comprising software encoded in non-transitory computer-readable media, for transmitting a communication, the software comprising instructions, operable when executed, to:
    detect at least two different frequencies of one or more spectrum holes;
    divide, by other than bit-by-bit serial-to-parallel conversion, a communication into a first portion, a second portion, and a third portion, wherein the third portion follows the second portion within the communication in a sequential order, and wherein the second portion follows the first portion within the communication in the sequential order;
    select a first frequency, a second frequency, and a third frequency from the detected frequencies, wherein the first, second, and third frequencies are different from each other;
    assign the first frequency to the first portion;
    assign the second frequency to the second portion;
    assign the third frequency to the third portion;
    transmit, via a communications device, the first portion at the first frequency assigned to the first portion;
    transmit, via the communications device, the second portion at the second frequency assigned to the second portion; and
    transmit, via the communications device, the third portion at the third frequency assigned to the third portion.

12. The computer program product of claim 11, wherein the first, second, and third frequencies are chosen randomly from the detected frequencies.

13. The computer program product of claim 11, wherein the first, second, and third frequencies are chosen sequentially from the detected frequencies.

14. The computer program product of claim 11, wherein the first portion, the second portion, and the third portion are transmitted in the sequential order.

15. The computer program product of claim 11, wherein the first portion, the second portion, and the third portion are transmitted in a non-sequential order different from the sequential order.

16. A computer program product comprising software encoded in non-transitory computer-readable media, for transmitting a communication, the software comprising instructions, operable when executed, to:
    detect at least one frequency of one or more spectrum holes;
    divide, by other than bit-by-bit serial-to-parallel conversion, a communication into a plurality of portions including a first portion, a second portion, and a third portion, wherein the third portion follows the second portion within the communication in a sequential order, and wherein the second portion follows the first portion within the communication in the sequential order; and transmit, via a communications device, the first portion, the second portion, and the third portion at the at least one frequency and in a non-sequential order different from the sequential order.

17. The computer program product of claim 16, wherein the first portion, the second portion, and the third portion are transmitted in a random order.

18. The computer program product of claim 16, wherein the instructions to transmit, via the communications device, the first portion, the second portion, and the third portion at the at least one frequency and in the non-sequential order different from the sequential order comprise instructions to transmit other portions of the plurality of portions at the at least one frequency and in the non-sequential order different from the sequential order.

19. The computer program product of claim 16, wherein the instructions to detect the at least one frequency of the one or more spectrum holes comprise instructions to detect at least two different frequencies of the one or more spectrum holes.

20. The computer program product of claim 19, further comprising instructions, operable when executed, to:
    select a first frequency, a second frequency, and a third frequency from the detected frequencies, wherein the first, second, and third frequencies are different from each other;
    assign the first frequency to the first portion;
    assign the second frequency to the second portion;
    assign the third frequency to the third portion;
    transmit, via the communications device, the first portion at the first frequency assigned to the first portion;
    transmit, via the communications device, the second portion at the second frequency assigned to the second portion; and
    transmit, via the communications device, the third portion at the third frequency assigned to the third portion.

* * * * *